(12) United States Patent
Yuge

(10) Patent No.: US 10,793,439 B2
(45) Date of Patent: Oct. 6, 2020

(54) FIBROUS CARBON NANOHORN AGGREGATE AND METHOD FOR PRODUCING THE SAME

(71) Applicant: NEC CORPORATION, Tokyo (JP)

(72) Inventor: Ryota Yuge, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 349 days.

(21) Appl. No.: 15/556,342

(22) PCT Filed: Mar. 4, 2016

(86) PCT No.: PCT/JP2016/056790
§ 371 (c)(1),
(2) Date: Sep. 7, 2017

(87) PCT Pub. No.: WO2016/147909
PCT Pub. Date: Sep. 22, 2016

(65) Prior Publication Data
US 2018/0105425 A1    Apr. 19, 2018

(30) Foreign Application Priority Data

Mar. 16, 2015 (JP) ................................. 2015-052185
Jun. 22, 2015 (JP) ................................. 2015-124577

(51) Int. Cl.
*C01B 32/18* (2017.01)
*B01J 21/18* (2006.01)
(Continued)

(52) U.S. Cl.
CPC ............... *C01B 32/18* (2017.08); *B01J 21/18* (2013.01); *B01J 21/185* (2013.01); *B01J 23/42* (2013.01);
(Continued)

(58) Field of Classification Search
CPC ......... C01B 32/18; C01B 32/15; C01B 32/05; C01B 32/158; C01B 32/159; C01B 32/16;
(Continued)

(56) References Cited

U.S. PATENT DOCUMENTS

2005/0158462 A1    7/2005  Iijima et al.
2012/0202060 A1*   8/2012  Yuge ..................... B82Y 30/00
                                                      428/367
2013/0316238 A1*  11/2013  Nishimura ............ B22F 1/0018
                                                      429/219

FOREIGN PATENT DOCUMENTS

JP    2003-146606 A    5/2003
JP    2003-313571 A   11/2003
(Continued)

OTHER PUBLICATIONS

Utsumi, et al. (2012), Porosity and Adsorption Properties of Single-Wall Carbon Nanohorn. In Tascon (Ed.), Novel Carbon Adsorbents (pp. 401-433) (Year: 2012).*
(Continued)

*Primary Examiner* — Daniel C. McCracken
(74) *Attorney, Agent, or Firm* — Sughrue Mion, PLLC

(57) ABSTRACT

Objects of the present invention is to provide a carbon nanohorn aggregate excellent in imparting conductivity, and to provide a carbon nanohorn aggregate excellent in both the impartation of conductivity and the dispersibility. The present invention provides a fibrous carbon nanohorn aggregate in which a plurality of single-walled carbon nanohorns are aggregated in a fibrous state. The fibrous carbon nanohorn aggregate is excellent in imparting conductivity, and can be produced by the same process as production of globular carbon nanohorn aggregates, whereby the carbon nanohorn aggregates containing fibrous ones and globular ones mixed therewith can satisfy both high conductivity and high dispersibility.

15 Claims, 4 Drawing Sheets

(51) Int. Cl.
*C01B 32/15* (2017.01)
*H01G 11/86* (2013.01)
*H01G 11/24* (2013.01)
*H01G 11/36* (2013.01)
*D01F 9/127* (2006.01)
*B01J 23/745* (2006.01)
*B01J 23/42* (2006.01)
*H01M 4/62* (2006.01)
*B01J 37/34* (2006.01)
*B82Y 30/00* (2011.01)
*B82Y 40/00* (2011.01)
*C01B 32/05* (2017.01)
*H01M 10/0525* (2010.01)
*H01M 4/90* (2006.01)

(52) U.S. Cl.
CPC ............ *B01J 23/745* (2013.01); *B01J 37/34* (2013.01); *B82Y 30/00* (2013.01); *B82Y 40/00* (2013.01); *C01B 32/15* (2017.08); *D01F 9/127* (2013.01); *H01G 11/24* (2013.01); *H01G 11/36* (2013.01); *H01G 11/86* (2013.01); *H01M 4/625* (2013.01); *C01B 32/05* (2017.08); *C01P 2004/50* (2013.01); *C01P 2004/64* (2013.01); *H01M 4/9083* (2013.01); *H01M 10/0525* (2013.01); *Y02E 60/13* (2013.01)

(58) Field of Classification Search
CPC ... C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 37/34; B01J 21/18; B01J 21/185; B01J 23/42; B01J 23/745; B82Y 30/00; B82Y 40/00; H01M 4/9083; H01M 10/0525; H01M 4/625; H01G 11/24; H01G 11/36; H01G 11/86; C01P 2004/50; C01P 2004/64; D01F 9/127; Y02E 60/13

See application file for complete search history.

(56) References Cited

FOREIGN PATENT DOCUMENTS

| | | |
|---|---|---|
| JP | 3479889 B2 | 12/2003 |
| JP | 2004-016976 A | 1/2004 |
| JP | 2007-161521 A | 6/2007 |
| JP | 3989256 B2 | 10/2007 |
| JP | 4234812 B2 | 3/2009 |
| JP | 2012-030979 A | 2/2012 |
| JP | 4873870 B2 | 2/2012 |
| JP | 2012-214342 A | 11/2012 |
| JP | 5384917 B2 | 1/2014 |
| JP | 2014-185074 A | 10/2014 |
| WO | 2004/108275 A1 | 12/2004 |
| WO | 2008/139963 A1 | 11/2008 |
| WO | 2011/046157 A1 | 4/2011 |
| WO | 2013/147031 A1 | 10/2013 |
| WO | 2013183187 A1 | 12/2013 |
| WO | 2015/025722 A1 | 2/2015 |

OTHER PUBLICATIONS

Geohegan, et al., Condensed phase grown of single-wall carbon nanotubes from laser annealed nanoparticulates, Applied Physics Letters 2001; 78(21): 3307-3309 (Year: 2001).*

Yuge, et al., Preparation and Characterization of Newly Discovered Fibrous Aggregates of Single-Walled Carbon Nanohorns, Adv. Mater. 2016; 28: 7174-7177 (published online May 25, 2016) (Year: 2016).*

International Search Report for PCT/JP2016/056790, dated Apr. 5, 2016.

Communication dated Jul. 20, 2018 from the European Patent Office in counterpart European application No. 16764739.5.

Yuge, R., et al., "High-rate charge/discharge properties of Li-ion battery using carbon-coated composites of graphites, vapor grown carbon fibers, and carbon nanohorns", Journal of Power Sources, vol. 266, 2014, pp. 471-474, XP028874340.

Yuge, R., et al., "Structure and Electrical Properties of Fibrous Aggregates of Carbon Nanohorns", Advanced Materials, 2016, p. 14-115, XP055491001.

* cited by examiner

[Fig. 1]
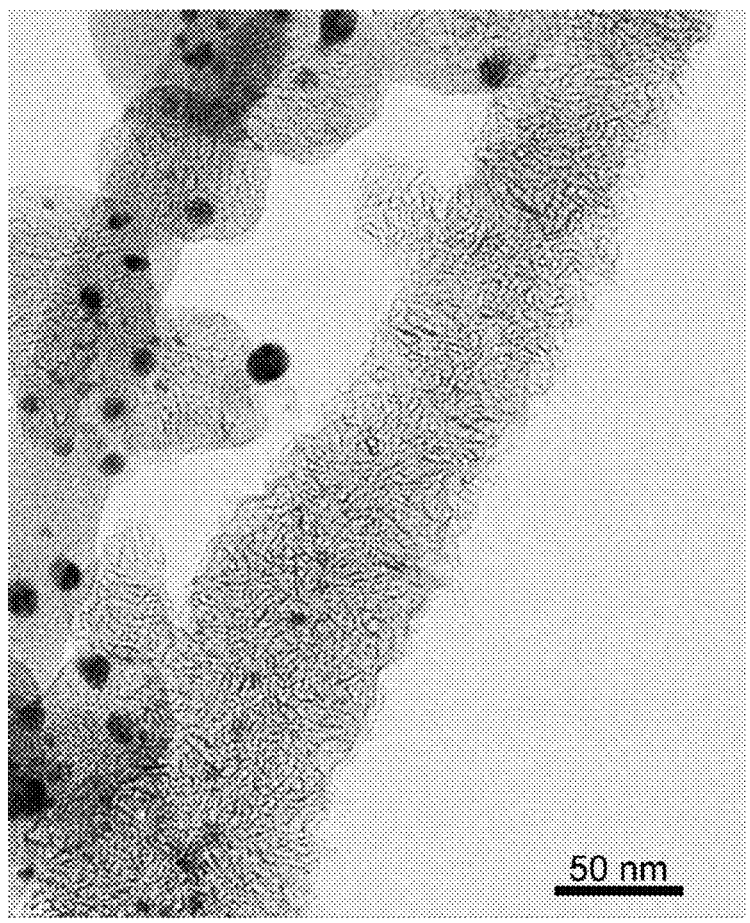
[Fig. 2]
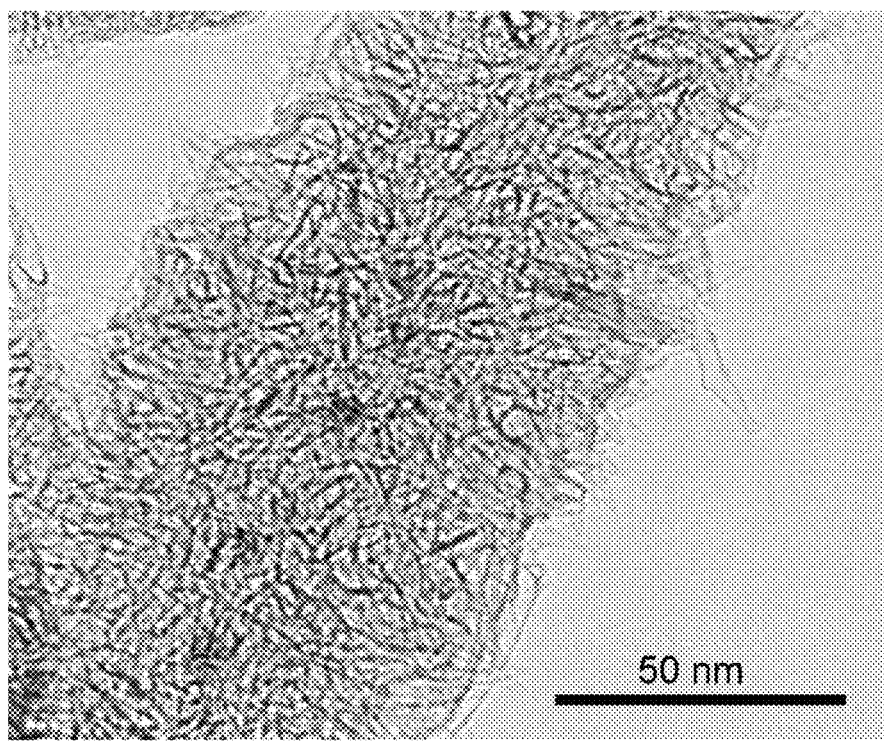

[Fig. 3]
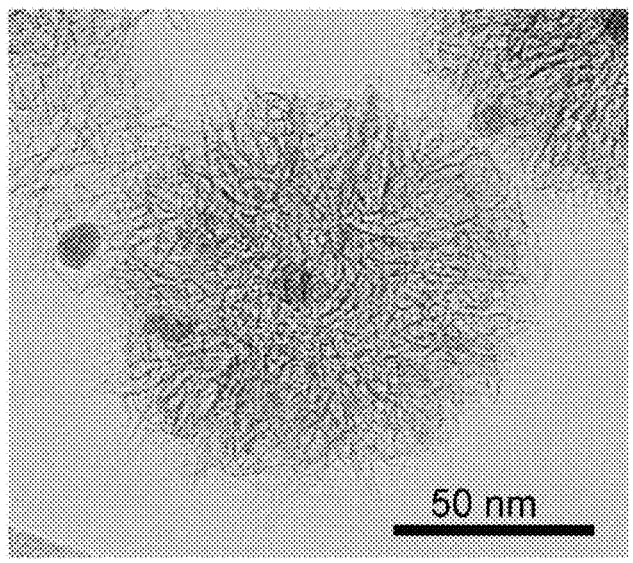
[Fig. 4]
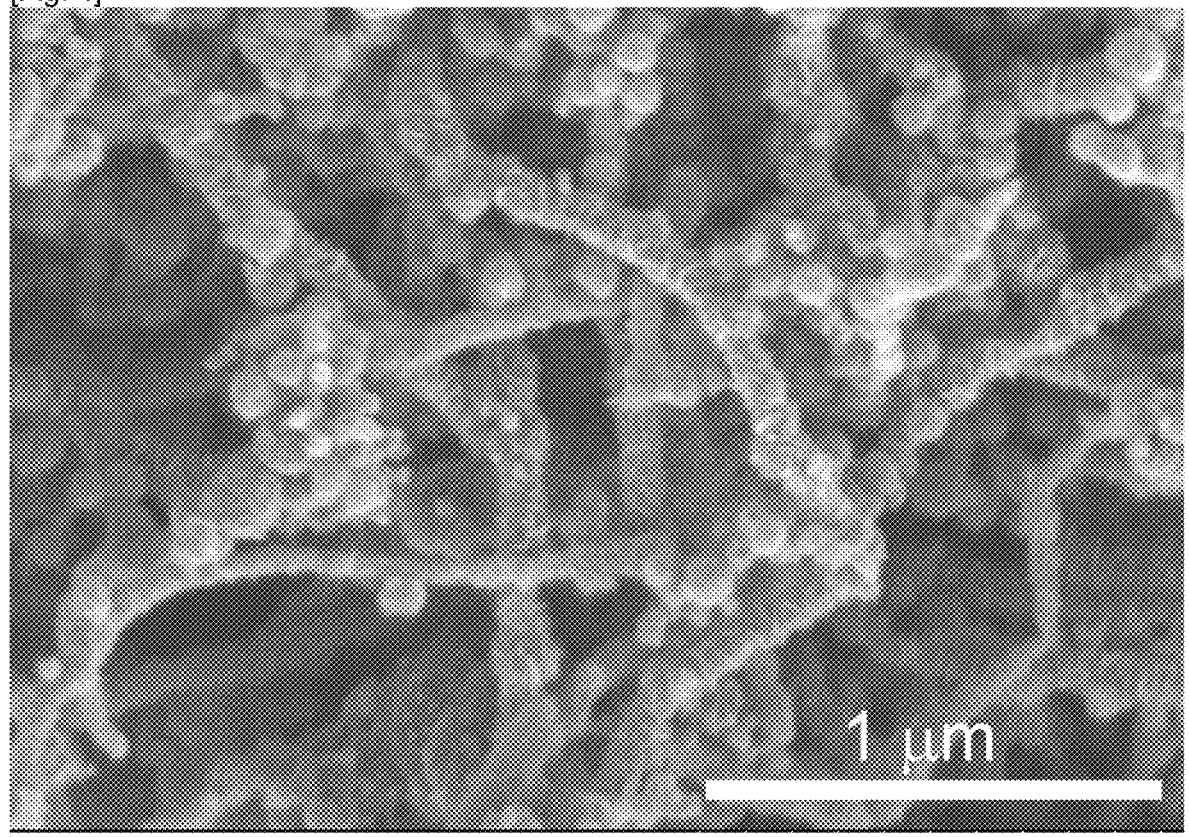

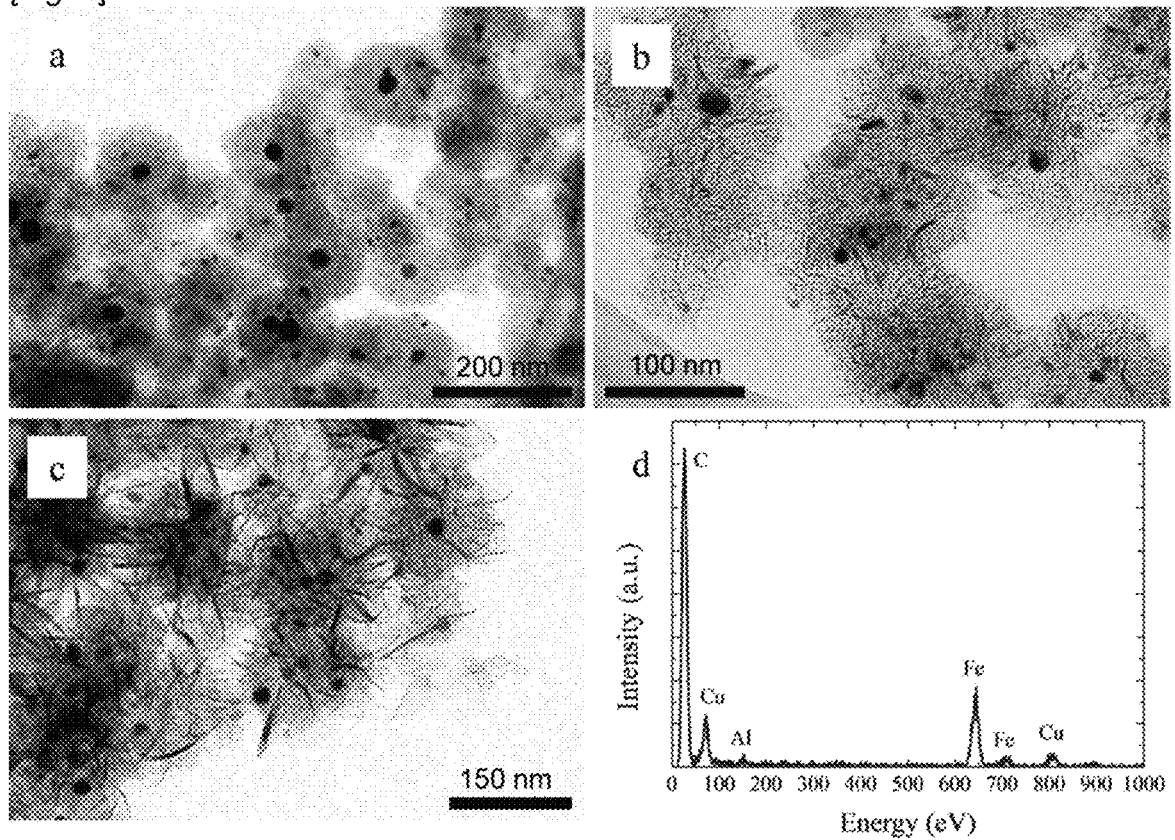
[Fig. 5]

[Fig. 6]
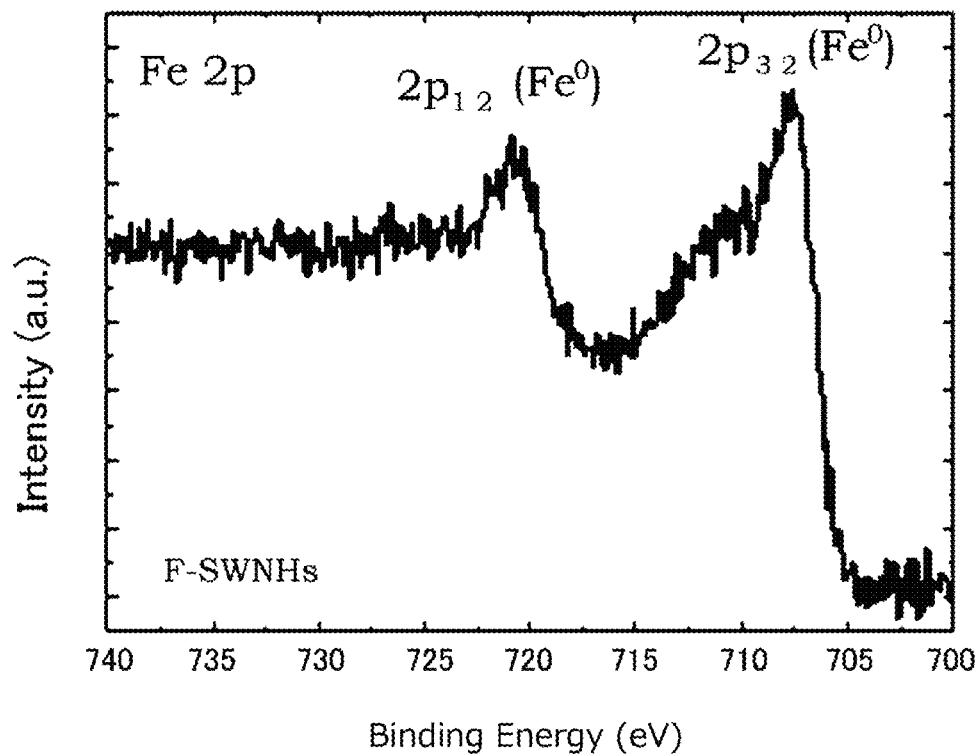
[Fig. 7]
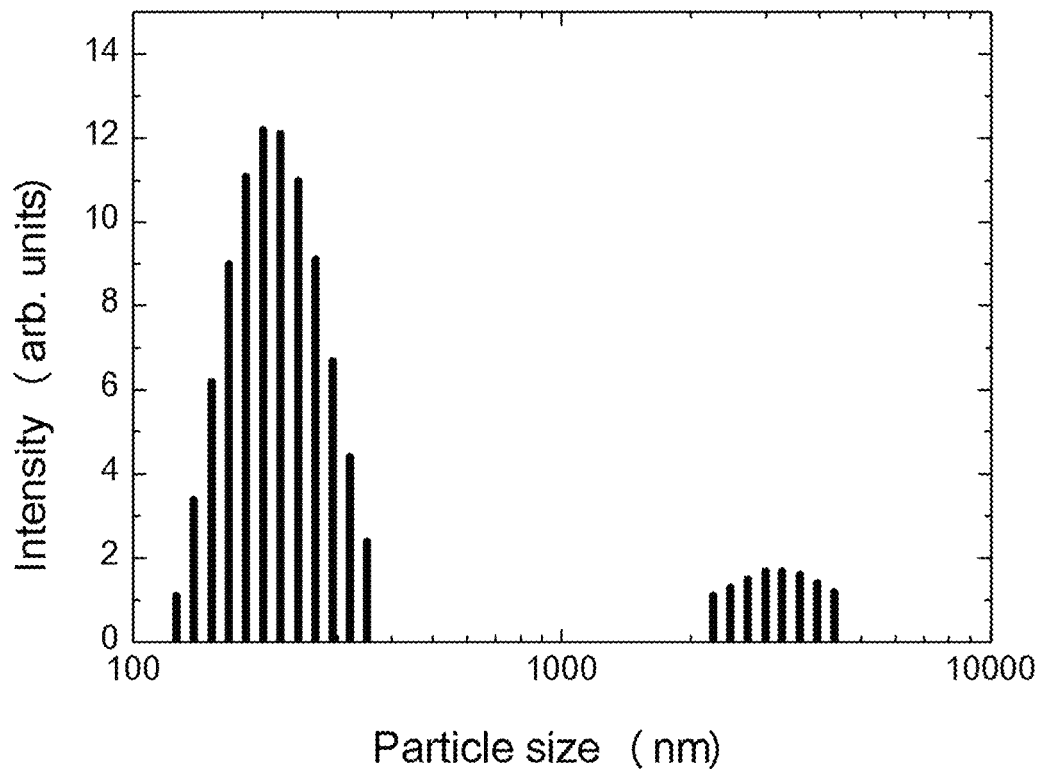

FIBROUS CARBON NANOHORN AGGREGATE AND METHOD FOR PRODUCING THE SAME

CROSS REFERENCE TO RELATED APPLICATIONS

This application is a National Stage of International Application No. PCT/JP2016/056790 filed Mar. 4, 2016, claiming priority based on Japanese Patent Application No. 2015-052185 filed Mar. 16, 2015 and Japanese Patent Application 2015-124577 filed Jun. 22, 2015, the contents of all of which are incorporated herein by reference in their entirety.

TECHNICAL FIELD

The present invention relates to a fibrous carbon nanohorn aggregate, and a method for producing the same.

BACKGROUND ART

Carbon materials are conventionally utilized as conductive materials, catalyst carriers, adsorbents, separating agents, inks, toners and the like; in recent years, on emergence of nano-carbon materials of nano size, such as carbon nanotubes and carbon nanohorns, features as their structural bodies have been paid attention to, and their applications have been energetically studied as described in the following: Patent Literature 1 (carbon nanohorn), Patent Literature 2 (DDS), Patent Literature 3 (solid lubricant), Patent Literature 4 (occlusion of methane gas), Patent Literature 5 (adsorbent), Patent Literature 6 (methane-cracking catalyst), Patent Literature 7 (catalyst carrier) and Patent Literature 8 (conductive material).

In recent years, along with the size and weight reduction, and the performance enhancement of cellular phones, notebook computers, electric vehicles and the like, lithium ion batteries having a light weight and a large charge capacity have been broadly used as secondary batteries used therein. Then, in applications such as electric vehicles and electric tools, the insufficiency of the large current load characteristic is a large problem. As countermeasures against this, the resistance reduction in electrodes, for example, the improvement of the rate characteristic, and the like have been studied.

The studies of the resistance reduction are made mainly on conductive auxiliary agents and the like. Patent Literature 8 discloses that a carbon nanohorn aggregate is studied as a conductive material, and by mixing a carbon nanohorn aggregate in a graphite material of a negative electrode, there is made a lithium ion battery lower in the reaction resistance, less causing a sharp capacity degradation and longer in life as compared with mixing of acetylene black, carbon nanotubes or the like. Carbon nanohorns, since having a six-membered ring structure of graphene, have a high conductivity, and since being spherical aggregates in uniform size, are highly dispersed and have a characteristic of being easily entangled on the electrode active substance surface.

CITATION LIST

Patent Literature

Patent Literature 1: JP4234812B
Patent Literature 2: JP4873870B
Patent Literature 3: JP2003-313571A
Patent Literature 4: JP2004-16976A
Patent Literature 5: JP3989256B
Patent Literature 6: JP2003-146606A
Patent Literature 7: JP3479889B
Patent Literature 8: JP5384917B

SUMMARY OF INVENTION

Technical Problem

However, since conventional carbon nanohorn aggregates have a globular structure of about 100 nm in diameter, when electrodes are fabricated, they are likely to make the internal resistance higher as compared with carbon materials of an acicular structure, for example, carbon nanotubes. This is because whereas the carbon materials having an acicular structure, since being capable of forming conductive paths of about a few micrometers, have a large effect of imparting the conductivity, the carbon nanohorn aggregates having a globular structure cannot form such long conductive paths. The materials having an acicular structure, however, are poor in dispersibility and have a problem with dispersibility enhancement.

By mixing a high-dispersible globular carbon nanohorn aggregate with a material having an acicular structure, there arises a possibility of simultaneously satisfying both the high conductivity and the high dispersibility. However, since the globular carbon nanohorn aggregate and the carbon material having an acicular structure are usually separately produced, the cost rises.

An object of the present invention is to provide a carbon nanohorn aggregate excellent in imparting conductivity. Another object of the present invention is to provide a carbon nanohorn aggregate excellent in both the impartation of conductivity and the dispersibility.

Solution to Problem

Then, as a result of exhaustive studies on carbon nanohorn aggregates developing high conductivity, the present inventor has found a fibrous carbon nanohorn aggregate excellent in imparting the conductivity. It has been further found that the fibrous carbon nanohorn aggregate can be formed simultaneously with a globular carbon nanohorn aggregate excellent in the dispersibility. As a result, it has been found that when fibrous and globular carbon nanohorn aggregates are simultaneously contained, there can be fabricated a lithium ion battery having the quick charge and discharge property low in the internal resistance and improved in the large current load characteristic (rate characteristic, the C rate: 1C means a current at which the battery is discharged to a predetermined voltage in one hour).

That is, according to one aspect of the present invention, there is provided a carbon nanohorn aggregate including a plurality of single-walled carbon nanohorns aggregated in a fibrous state.

Further, according to another aspect of the present invention, the fibrous carbon nanohorn aggregate includes carbon nanohorn aggregates of at least one, among seed-shaped, bud-shaped, petal-dahlia-shaped and petal-shaped carbon nanohorn aggregates, connected in a fibrous state.

There is further provided a carbon nanohorn aggregate including the fibrous carbon nanohorn aggregate and seed-shaped, bud-shaped, dahlia-shaped, petal-dahlia-shaped and petal-shaped globular carbon nanohorn aggregates mixed therewith.

There is further provided a carbon nanohorn aggregate including a catalyst metal incorporated in the interior of the carbon nanohorn aggregate.

In further another aspect of the present invention, there is provided a lithium ion secondary battery including the carbon nanohorn aggregate for use in an electrode material.

Further, in one aspect of the present invention, the carbon nanohorn aggregate can be used for a catalyst or a catalyst carrier, and there is provided a fuel cell including the carbon nanohorn aggregate used for the catalyst or the catalyst carrier.

Further, in one aspect of the present invention, there is provided an electrochemical actuator including the carbon nanohorn aggregate for use in an electrode.

Further, in one aspect of the present invention, there is provided an electric double-layer capacitor including the carbon nanohorn aggregate for use in an electrode.

A carbon nanohorn aggregate according to one aspect of the present invention can be produced by a method for producing the carbon nanohorn aggregate, the method including:
(1) making the interior of a vessel, in which a catalyst-containing carbon target is disposed therein, to be under an atmosphere of an inert gas, a nitrogen gas or a mixed thereof;
(2) evaporating the target by laser ablation while rotating the target; and
(3) controlling a gas flow volume at a constant rate in the stage of the evaporating the target.

Advantageous Effects of Invention

According to one aspect of the present invention, there is provided a high-conductivity fibrous carbon nanohorn aggregate. Further, according to another aspect of the present invention, there can be provided a mixture of a fibrous carbon nanohorn aggregate and a globular carbon nanohorn aggregate in a same process. In this mixture, since the fibrous carbon nanohorn aggregate and the globular carbon nanohorn aggregate when they are mutually highly dispersed and are mutually adsorbed, have many contact points at their interfaces, the mixture forms good conductive paths and exhibits a low resistance loss in charge and discharge.

Further, the method for producing a carbon nanohorn aggregate according to the present invention includes a less number of steps, is of a lower cost, and is better in mass productivity, as compared with conventional methods.

BRIEF DESCRIPTION OF DRAWINGS

FIG. 1 is a transmission electron microscopic image of fibrous carbon nanohorn aggregates fabricated by the present invention.

FIG. 2 is a transmission electron microscopic image of fibrous carbon nanohorn aggregates fabricated by the present invention.

FIG. 3 is a transmission electron microscopic image of globular carbon nanohorn aggregates fabricated by the present invention.

FIG. 4 is a scanning electron microscopic image of fibrous carbon nanohorn aggregates and globular carbon nanohorn aggregates fabricated by the present invention.

FIG. 5 is transmission electron microscopic images (a) to (c) and an EDX result (d) of globular carbon nanohorn aggregates fabricated by the present invention.

FIG. 6 is an XPS result of fibrous carbon nanohorn aggregates and globular carbon nanohorn aggregates fabricated by the present invention.

FIG. 7 is a particle size distribution measurement result by a dynamic light scattering method of fibrous carbon nanohorn aggregates and globular carbon nanohorn aggregates fabricated by the present invention.

DESCRIPTION OF EMBODIMENT

The present invention has the above characteristics, and the example embodiment will be described hereinafter.

FIG. 1 and FIG. 2 are transmission electron microscopic (TEM) images of fibrous carbon nanohorn aggregates according to an example embodiment. Each single-walled carbon nanohorn constituting the fibrous carbon nanohorn aggregate according to the present example embodiment is the same as single-walled carbon nanohorns constituting conventional globular carbon nanohorn aggregates. The fibrous carbon nanohorn aggregate according to the present example embodiment is so formed that seed-shaped, bud-shaped, dahlia-shaped, petal-dahlia-shaped and petal-shaped (a graphene sheet structure) carbon nanohorn aggregates are further mutually connected with single-walled carbon nanohorns; that is, one or more of these carbon nanohorn aggregates are contained in the fibrous structure. Since fibrous carbon nanohorn aggregates and globular carbon nanohorn aggregates are fabricated by evaporating a target using a catalyst metal, in the interior of fibrous carbon nanohorn aggregates (FIGS. 1 and 2) and globular carbon nanohorn aggregates (FIG. 3), the catalyst metal is present (non-transparent particles in the Drawings). As described later, when fibrous carbon nanohorn aggregates are produced by the production method according to the present invention, globular carbon nanohorn aggregates are simultaneously produced. FIG. 4 is a scanning electron microscopic (SEM) image of fibrous carbon nanohorn aggregates and globular carbon nanohorn aggregates fabricated by the present invention. Since fibrous and globular products are present as seen in FIG. 4, there is made a structure in which the fibrous products are hardly coagulated. The fibrous carbon nanohorn aggregates further have high dispersibility in a solution as in the globular carbon nanohorn aggregates. In the present description, fibrous carbon nanohorn aggregates and globular carbon nanohorn aggregates are collectively referred to simply as carbon nanohorn aggregates in some cases. Here, the fibrous carbon nanohorn aggregates and the globular carbon nanohorn aggregates can be separated by utilizing a centrifugal separation method, a difference in the settling rate after dispersion in a solvent, a gel permeation chromatography, or the like. In order to maintain the dispersibility of the fibrous carbon nanohorn aggregates, it is preferable that the fibrous carbon nanohorn aggregates be used as they are without the separation. The fibrous carbon nanohorn aggregate according to the present invention is not limited to the above structure as long as single-walled carbon nanohorns are aggregated in a fibrous state.

The diameter of each fabricated single-walled carbon nanohorn is about 1 nm to 5 nm, and the length is 30 nm to 100 nm. The fibrous carbon nanohorn aggregate can be made to have a diameter of about 30 nm to 200 nm, and a length of about 1 μm to 100 μm. By contrast, the globular carbon nanohorn aggregate has nearly a uniform size of a diameter of about 30 nm to 200 nm.

The obtained globular carbon nanohorn aggregate is formed as a seed-shaped, bud-shaped, dahlia-shaped, petal-dahlia-shaped and petal-shaped one singly or as a composite thereof. The seed-shaped one has almost no or no angular projections on its globular surface; the bud-shaped one has slightly angular projections on its globular surface; the dahlia-shaped one is a shape having many angular projections on its globular surface; and the petal-shaped one is a shape having petal-like projections on its globular surface. The petal structure is a graphene sheet structure having a width of 50 to 200 nm and a thickness of 0.34 to 10 nm and having 2 to 30 graphene sheets. The petal-dahlia-shaped one has an intermediate structure between the dahlia-shaped one and the petal-shaped one. The globular carbon nanohorn aggregates are separately produced in a mixed state with the fibrous carbon nanohorn aggregates. The form and the particle size of the produced globular carbon nanohorn aggregates vary depending on the kind and the flow volume of a gas.

The fabrication method involves using carbon containing a catalyst as a target (referred to as a catalyst-containing carbon target), and heating the catalyst-containing carbon target in a nitrogen atmosphere, an inert atmosphere or a mixed atmosphere by laser abrasion while rotating the target in a vessel in which the target has been disposed, to thereby evaporate the target. In the stage of cooling of the evaporated carbon and catalyst, fibrous carbon nanohorn aggregates and globular carbon nanohorn aggregate are obtained. Although methods using a carbon target containing a catalyst are partially known as production methods of carbon nanotubes, production of conventional carbon nanohorn aggregates (globular carbon nanohorn aggregates) uses a pure (100%) graphite target containing no catalyst. The fabrication method can also use an arc discharge method or a resistance heating method other than the above laser ablation method. The laser ablation method, however, is more preferable from the viewpoint of being capable of continuous production at room temperature and in the atmospheric pressure.

The laser ablation (LA) method employed in the present invention is a method in which a laser light is pulsatingly or continuously applied on a target, and when an irradiation intensity becomes a threshold value or higher, the target converts the energy and resultantly produces plumes to thereby deposit a product on a substrate installed on the downstream of the target, or produce a product in a space in the apparatus and recover the product in a recovery chamber.

For the laser ablation, there can be used $CO_2$ laser, YAG laser, excimer laser, semiconductor laser or the like, and $CO_2$ laser, which is easily made to be of a high power, is most suitable. The $CO_2$ laser can have a power of 1 kW/cm$^2$ to 1,000 kW/cm$^2$, and can carry out continuous irradiation and pulsating irradiation. For the production of carbon nanohorn aggregates, the continuous irradiation is more desirable. A laser light is condensed by a ZnSe lens or the like, and irradiated. Further, by making the target to rotate, the continuous synthesis can be made. The target rotation rate can be set optionally, but is especially preferably 0.1 to 6 rpm. When the rotation rate is 0.1 rpm or higher, the graphitization can be suppressed; and when being 6 rpm or lower, the increase of amorphous carbon can be suppressed. At this time, the laser power is preferably 15 kW/cm$^2$ or higher, and 30 to 300 kW/cm$^2$ is most effective. When the laser power is 15 kW/cm$^2$ or higher, the target is evaporated suitably to thereby make the synthesis easy. Further, when the laser power is 300 kW/cm$^2$ or lower, the increase of amorphous carbon can be suppressed. The pressure in the vessel (chamber) can be 13,332.2 hPa (10,000 Torr) or lower, but with the pressure nearer vacuum, carbon nanotubes are more easily produced and carbon nanohorn aggregates are more hardly obtained. Use of the pressure of preferably 666.61 hPa (500 Torr) to 1,266.56 hPa (950 Torr), and more preferably nearly normal pressure (1,013 hPa (1 atm≈760 Torr) is suitable also for mass synthesis and cost reduction. Further, the irradiation area can be controlled according to the laser power and the degree of the light condensation by a lens, and can be 0.005 cm$^2$ to 1 cm$^2$.

As the catalyst, there can be used Fe, Ni or Co singly or in a mixture thereof. The concentration of the catalyst can suitably be selected and is, with respect to carbon, preferably 0.1% by mass to 10% by mass, and more preferably 0.5% by mass to 5% by mass. When the concentration is 0.1% by mass or higher, the production of fibrous carbon nanohorn aggregates is secured. Further, when the concentration is 10% by mass or lower, the increase of the target cost can be suppressed.

The temperature in the vessel can be optionally employed, and is preferably at 0 to 100° C. and more preferably at room temperature suitable for mass synthesis and cost reduction.

The inside of the vessel is made to be the above atmosphere by introducing a nitrogen gas, an inert gas or the like singly or in a mixture thereof. The gas is circulated in the reaction vessel, and produced substances can be collected on the flow of the gas. Also, a closed atmosphere may be made by the introduced gas. The flow volume of the atmosphere gas can be an optional volume, but is suitably in the range of 0.5 L/min to 100 L/min. In the stage of the evaporation of the target, the gas flow volume is controlled at a constant rate. The gas flow volume can be made at a constant rate by making the supplied gas flow volume and the discharged gas flow volume to be coincident. In the case where the stage is carried out nearly at normal pressure, the control can be made by pressing out and discharging the gas by the supplied gas.

In the fibrous carbon nanohorn aggregates and globular carbon nanohorn aggregates obtained as in the above, part of their carbon skeleton may be replaced by a catalyst metal element, a nitrogen atom and the like.

In the case where fine holes are opened on a carbon nanohorn aggregate, it can be carried out by an oxidation treatment. By carrying out the oxidation treatment, defect portions such as 5-membered rings and 7-membered rings are oxidized. As a result, there are made openings at sites having 5-membered rings and 7-membered rings in the side surface, the tip portions and the like of the carbon nanohorn. By the oxidation treatment, surface functional groups containing oxygen are formed on opening portions. Further, the oxidation treatment can use a gas phase process or a liquid phase process. In the case of the gas phase process, as the atmosphere gas, air, oxygen or carbon dioxide can be used, and air is suitable from the viewpoint of cost. Further, the temperature can be in the range of 300 to 650° C., and is more suitably 400 to 550° C. When the temperature is 300° C. or higher, there is no apprehension that carbon scarcely burns and openings cannot be made. Further, when the temperature is 650° C. or lower, burning of the entire of the carbon nanohorn aggregate can be suppressed. In the case of the liquid phase process, there can be utilized nitric acid, sulfuric acid, hydrogen peroxide or the like. In the case of nitric acid, it can be used in the temperature range of room temperature to 120° C. When the temperature is 120° C. or lower, the oxidizing power never becomes too high and the oxidation never occurs than necessary. In the case of hydrogen peroxide, it can be used in the temperature range of room temperature to 100° C., and 40° C. or higher is preferable. At 40° C. or higher, the oxidizing power efficiently acts and can efficiently form openings. Further, in the case of the liquid process, combined use with light irradiation is more effective.

The catalyst (metal) embedded in the production of the carbon nanohorn aggregate, since being dissolved in nitric acid, sulfuric acid and hydrochloric acid, can be removed. Hydrochloric acid is suitable from the viewpoint of easy usage. The temperature at which the catalyst is dissolved can suitably be selected, but in the case where the catalyst is sufficiently removed, the removal is desirably carried out by heating at 70° C. or higher. Further, since there may be the case where the catalyst is covered with a carbon coating in the production of the carbon nanohorn aggregate, a pre-treatment to remove the carbon coating is desirably carried out. The pre-treatment is desirably carried out by heating at about 250 to 450° C. in air.

The obtained carbon nanohorn aggregate can be improved in the crystallinity by being heat treated in an inert gas, hydrogen or vacuum. The heat treatment temperature can be 800 to 2,000° C., but is preferably 1,000 to 1,500° C. The surface functional groups formed by the oxidation treatment to form openings can be removed also by this heat treatment. The heat treatment temperature can be 150 to 2,000° C. In order to remove carboxyl groups, hydroxide groups and the like as the surface functional groups, 150° C. to 600° C. is desirable. The removal of carbonyl groups and the like as the surface functional groups is desirably at 600° C. or higher. Further, the surface functional groups can be removed by reduction. The reduction can be carried out in a gas atmosphere such as hydrogen or a liquid atmosphere such as hydrazine.

The above mixture (hereinafter, referred to also as a carbon nanohorn aggregate mixture) of fibrous carbon nanohorn aggregates and globular carbon nanohorn aggregates can be used as it is, or the fibrous carbon nanohorn aggregates can be isolated and used, for an electrode material. Further, there can be used, as an electrode material, a nano-carbon composite in which the carbon nanohorn aggregate mixture is mixed with one or more of carbon nanotubes, carbon fibers, graphene, carbon black, fullerene, graphite and amorphous carbon. The carbon nanohorn aggregate mixture can be used as it is, or the fibrous carbon nanohorn aggregates can be isolated and used, as a catalyst or a catalyst carrier. Such an electrode material and catalyst can be used as an electrode material or a catalyst for lithium ion batteries, fuel cells, electrochemical actuators, electric double-layer capacitors, lithium ion capacitors, organic radical batteries, solar cells, air cells, sulfur cells and the like.

[Lithium Ion Battery]

In a lithium ion battery, a carbon nanohorn aggregate mixture fabricated in the present invention can be used as a conductive material of an electrode as an electrode material together with an active material for the lithium ion battery. The electrode material can be used for a positive electrode and a negative electrode; and the positive electrode contains the carbon nanohorn aggregate mixture as a conductive material together with a positive electrode active material, and the negative electrode contains the carbon nanohorn aggregate mixture as a conductive material together with a negative electrode active material. A lithium secondary battery can be fabricated by use of the obtained positive electrode and negative electrode, and an electrolyte and as required, a separator.

As the electrolyte, there is used a nonaqueous solution containing a lithium salt such as $LiPF_6$, $LiClO_4$, $LiBF_4$, $LiAlO_4$, $LiAlCl_4$, $LiSbF_6$, LiSCN, LiCl, $LiCF_3SO_3$ or LiFSI, and there can be used one of or a mixture of two or more thereof as the lithium salt. There can also be used a known gel electrolyte, a known solid electrolyte or the like as the electrolyte.

As a nonaqueous solvent of the electrolyte solution, there can be used one of or a combination of two or more of propylene carbonate, ethylene carbonate, dimethyl carbonate, diethyl carbonate, ethyl methyl carbonate and the like.

As the positive electrode active material, there can be used a known lithium-containing transition metal oxide. The lithium-containing transition metal oxide specifically includes $LiCoO_2$, $LiNiO_2$, $LiMn_2O_4$, $LiFePO_4$, $LiFeSiO_4$, $LiFeBO_3$, $Li_3V_2(PO_4)_3$, $Li_2FeP_2O_7$, and lithium-rich laminar cathode materials ($xLi_2MnO_3 \cdot (1-x)LiMO_2$ (M=Co, Fe, or Ni)).

As the negative electrode active material, a known one can be used. The negative electrode active material specifically includes silicon, silicon compounds such as silicon oxide, graphite and amorphous carbon.

As the conductive material, there can be used, in addition to the carbon nanohorn aggregate mixture fabricated by the present invention, carbon conductive materials such as acetylene black, Ketjen Black, carbon fibers, carbon nanotubes, graphene and graphene sheets. The above nano-carbon composite can further be used as the conductive material.

[Fuel Cell]

In a fuel cell, the carbon nanohorn aggregate fabricated by the present invention can be used as it is a mixture of fibrous and globular carbon nanohorn aggregates, or the fibrous carbon nanohorn aggregates are isolated and can be used, as a catalyst.

The carbon nanohorn aggregate fabricated by the present invention, since having a catalytic activity on the reaction in which electrons are released from hydrogen or an organic liquid fuel such as methanol to create hydrogen ions, and having a catalytic activity on the reaction in which water is produced from the hydrogen ions, oxygen and the electrons, has a function as a catalyst for a fuel cell. Further, the carbon nanohorn aggregate, since being large in the specific surface area, being very high in the conductivities of the fuel as a raw material and an oxidizing agent and the conductivities of the hydrogen ions and water as reaction products, and being high in the electron conductivity in electrodes, can improve the power of the fuel cell.

The carbon nanohorn aggregate fabricated by the present invention, since further having a function that a metal catalyst having a catalytic function is carried or adhered as microparticles thereon, can remarkably improve the catalytic function in a fuel cell using these. The metal catalyst to be carried includes Pt, Ru, Pd, Au, Ag, Co, Cu, Fe, Ni and alloys thereof and composites thereof. The metal catalyst contained in the carbon target in production of the carbon nanohorn aggregate can be used as it is, as a part of carried catalysts.

[Electrochemical Actuator]

An electrochemical actuator refers to a device using as its driving force an electrochemical process such as an electrochemical reaction or the charge and discharge of an electric double-layer. The carbon nanohorn aggregate mixture fabricated by the present invention can be used for a positive electrode and a negative electrode as electrode materials. The fibrous carbon nanohorn aggregates can also be used singly by separating the fibrous carbon nanohorn aggregates from the globular carbon nanohorn aggregates. The mixture can also be used by suitably controlling the proportions of the fibrous carbon nanohorn aggregates and the globular carbon nanohorn aggregates.

The electrochemical actuator is constituted of three layers of a stacked body in which electrode layers of a positive electrode and a negative electrode are partitioned by an electrolyte layer therebetween. The electrolyte layer is a resin layer capable of ion exchange, in which a cationexchange resin is impregnated with an electrolyte solution being an electrolyte. Further, the electrolyte layer may be a gelatinous one in which a base polymer such as polyvinylidene fluoride is mixed with an ionic liquid. The electrode layers of the positive electrode and the negative electrode use a nano-carbon, a polymer and an ionic liquid.

As the nano-carbon, there can be used, in addition to the carbon nanohorn aggregate fabricated by the present invention and the isolated fibrous carbon nanohorn aggregate, globular carbon nanohorn aggregates, carbon nanotubes, graphene, carbon black and the like. The above nano-carbon composite can also be used.

[Electric Double-Layer Capacitor]

Also in an electric double-layer capacitor, the carbon nanohorn aggregate fabricated by the present invention can be used as an electrode material. The fibrous carbon nanohorn aggregates, since having a high specific surface area and a high conductivity, further being fibrous, and having carbon nanohorns radially aggregated, makes many contact points with the globular carbon nanohorn aggregates and can easily form conductive paths inside an electrode. Hence, there can be realized a high-capacity and high-power electric double-layer capacitor. The electric double-layer capacitor has a structure in which a positive electrode and a negative electrode are partitioned by a separator therebetween. An electrolyte solution can utilize an aqueous or nonaqueous electrolyte, but particularly an ionic liquid that has a broad potential range is suitable for realizing large capacity.

In the case where the carbon nanohorn aggregate is used as an electrode material for an electric double-layer capacitor, it is preferable that the specific surface area of the carbon nanohorn aggregate be large. By oxidatively treating the fibrous carbon nanohorn aggregate, defect portions such as 5-membered rings and 7-membered rings are oxidized. As a result, there are made opening at sites having 5-membered rings and 7-membered rings on side surfaces and tip portions of the carbon nanohorn. Thereby, the internal space of the carbon nanohorns can become utilized and the specific surface area can be increased remarkably.

EXAMPLES

Hereinafter, the present invention will be described in more detail by way of Examples. Of course, the present invention is not limited to the following Examples.

Example 1

A carbon target containing 1% by mass of iron was subjected to $CO_2$ laser ablation in a nitrogen atmosphere to thereby fabricate fibrous carbon nanohorn aggregates and globular carbon nanohorn aggregates (Sample 1). Experiment details will be described hereinafter. The graphite target containing 1% by mass of iron was rotated at 2 rpm. The energy density of the $CO_2$ laser was 50 kW/cm$^2$ in continuous irradiation, and the temperature of a chamber was room temperature. The gas flow volume in the chamber was regulated so as to become 10 L/min. The pressure was controlled at 933.254 to 1,266.559 hPa (700 to 950 Torr). Further, as comparative samples, there were fabricated the samples having been subjected to the laser ablation by using a carbon target containing no catalyst and in an Ar atmosphere or a nitrogen atmosphere and under the same other conditions (Ar: Sample 2, nitrogen: Sample 3).

FIG. 4 is an SEM image of Sample 1. Fibrous and globular substances were observed. The fibrous one had a diameter of about 30 to 100 nm, and a length of a few micrometers to several tens of micrometers. The globular one had a diameter of about 30 to 200 nm, in which a nearly uniform size accounted for many thereof. FIG. 1, FIG. 2, FIG. 3 and FIG. 5 are TEM images of products. From observation results of FIGS. 1 and 2, it was found that the fibrous substance was so made that single-walled carbon nanohorns of about 1 to 5 nm in diameter and about 40 to 50 nm in length were aggregated in a fibrous state. Further, from observation results of FIG. 3 and FIGS. 5a to 5c, it was found that the globular substance was so made that seed-shaped, bud-shaped, dahlia-shaped and petal-dahlia-shaped carbon nanohorn aggregates were mixed. A result of analysis of black particles by EDX (energy dispersive X-ray spectroscopy) is FIG. 5d. Mainly carbon and iron were detected. Particles of iron were much present in the central part of the aggregate, but were present also out of the center.

By contrast, in Samples 2 and 3, globular substances were observed, but no fibrous substances were observed.

FIG. 6 is an XPS (X-ray photoelectron spectroscopy) result of Sample 1. From the position of the Fe2p spectrum, it was found that iron was 0-valent and that in Sample 1, no carbide nor oxide were formed.

Sample 1 was ultrasonically dispersed in ethanol to thereby fabricate a dispersion liquid. FIG. 7 is a particle size distribution of the obtained dispersion liquid as measured in a solution by a dynamic light scattering method. Size distributions in the ranges of 100 to 300 nm and 2,000 nm to 5,000 nm were recognized. From the SEM image and the TEM images, it was found that the former range was globular carbon nanohorn aggregates and the latter range was fibrous carbon nanohorn aggregates, in a nearly monodisperse state in ethanol. Therefore, it was found that the fibrous carbon nanohorn aggregates had high dispersibility.

Sample 1 was ultrasonically dispersed in ethanol to thereby fabricate a dispersion liquid. The dispersion liquid was dropped on a silicon substrate, and dried to thereby fabricate a thin film. This process was repeated until the film thickness became 1 μm. Further, for comparison, Sample 2 was treated by the same method. The resistivity measurement was carried out by arranging 4 probe needles of a prober in a line, making a current I to flow to the outer pair of the needles, and measuring a voltage V between the inner pair of the needles. The acquired sheet resistivities were 1 Ω·cm for Sample 1 and 15 Ω·cm for Sample 2. From the result, it was found that when the fibrous carbon nanohorn aggregates were contained, the conductivity was improved.

Example 2

Fibrous carbon nanohorn aggregates and globular carbon nanohorn aggregates were fabricated as in Sample 1 of Example 1, except for using a carbon target containing 5% by mass of iron. On TEM observation and SEM observation of the obtained product, it was observed that both of fibrous carbon nanohorn aggregates and globular carbon nanohorn aggregates were fabricated. Either of the carbon nanohorn aggregates contained seed-shaped, bud-shaped, dahlia-shaped and petal-dahlia-shaped carbon nanohorn aggregates. The ratio of the fibrous structure to the globular structure was slightly higher than Sample 1 of Example 1.

Example 3

A carbon target containing 5% by mass of iron was subjected to $CO_2$ laser ablation in a nitrogen atmosphere to thereby fabricate fibrous carbon nanohorn aggregates and globular carbon nanohorn aggregates. At this time, the target was rotated at 2 rpm. The energy density of the $CO_2$ laser was 150 kW/cm² in continuous irradiation, and the temperature of a chamber was room temperature. The gas flow volume in the chamber was regulated so as to become 10 L/min. The pressure was controlled at 933.254 to 1,266.559 hPa (700 to 950 Torr). On TEM observation and SEM observation of the obtained product, it was observed that both of fibrous carbon nanohorn aggregates and globular carbon nanohorn aggregates were fabricated. Either of the carbon nanohorn aggregates contained seed-shaped, bud-shaped, dahlia-shaped and petal-dahlia-shaped carbon nanohorn aggregates, but dahlia-shaped ones and petal-dahlia-shaped ones were much. The ratio of the fibrous structure to the globular structure was slightly higher than Sample 1 of Example 1.

Example 4

[Lithium Ion Batteries]

In Example 4, the carbon nanohorn aggregate according to the present invention was used as a conductive material of a negative electrode of lithium ion batteries. A negative electrode slurry was prepared by mixing 92% by mass of graphite, 4% by mass of a polyvinylidene fluoride (PVDF) and 4% by mass of Sample 1 (conductive agent), further mixing N-methyl-2-pyrrolidinone and fully stirring the mixture. The negative electrode slurry was applied in a thickness of 100 μm on a copper foil of 10 μm in thickness. Thereafter, the resultant was dried at 120° C. for 1 hour, and roller pressed to thereby press mold an electrode. Further, the electrode was punched out into 2 cm² to thereby fabricate a negative electrode. A lithium ion secondary battery (test cell) was fabricated (Sample A1) by using the obtained negative electrode, an Li foil as a positive electrode, an electrolyte solution and a separator. The electrolyte solution was prepared by dissolving $LiPF_6$ in a concentration of 1 M/L in a mixed solvent of ethylene carbonate and methyl ethyl carbonate (3:7 in volume ratio). As the separator, a polyethylene-made porous film of 30 μm was used. As the conductive material, Samples 2 and 3 were used and batteries were fabricated (Sample B1, Sample C1) by the same method.

For the fabricated lithium ion batteries, charge and discharge characteristics were examined in the following manner. First, the secondary battery was set on a charge and discharge tester; charge was carried out at a constant current of 0.1 mA/cm² until the voltage reached 0 V; and charge was carried out by reducing the current in the 0-V state. Then, the charge was finished at the time point when the current value became 50 μA/cm². Discharge was carried out at a constant current of 0.1 mA/cm²; the discharge was finished at the time pint when the cell voltage reached 1.5 V; and the discharge capacity was determined. The acquired discharge capacity was about 380 mAh/g for every of Samples 1, 2 and 3. Further, by measuring the charge capacity at 0.1 C, 2 C, 5 C and 10 C, the rate characteristic was evaluated (the C rate: 1C means a current at which the battery is discharged to a predetermined voltage in one hour). It was found from Table 1 that when Sample 1 was used as the conductive material of the negative electrode, the charge rate characteristic was improved. This is considered to be because since fibrous carbon nanohorn aggregates and highly-dispersive globular carbon nanohorn aggregates were contained, good conductive paths were formed and the internal resistance of the battery was reduced.

TABLE 1

| | | 2 C/0.1 C (%) | 5 C/0.1 C (%) | 10 C/0.1 C (%) |
|---|---|---|---|---|
| Sample A1 | charge | 80 | 65 | 30 |
| Sample B1 | charge | 80 | 50 | 20 |
| Sample C1 | charge | 80 | 50 | 20 |

Example 5

[Lithium Ion Batteries]

In Example 5, the carbon nanohorn aggregate according to the present invention was used as a conductive material of a positive electrode of lithium ion batteries. A paste was prepared by mixing NCM523 (Unicore Japan (KTX10)) as a positive electrode material, a polyvinylidene fluoride (PVDF) as a binder, and Sample 1 as a conductive material, so as to become 92:4:4 (in weight ratio), and using N-methyl-2-pyrrolidone as a solvent. The obtained paste was applied in a thickness of 70 μm on an Al foil for current collector. Thereafter, the resultant was dried at 120° C. for 1 hour, and roller pressed to thereby press mold an electrode. The electrode was punched out into 2 cm² to thereby make a positive electrode. As a counter electrode, a graphite was used. An electrolyte solution was prepared by mixing $LiPF_6$ in a concentration of 1 M/L in ethylene carbonate and methyl ethyl carbonate of 4:6 in volume ratio. A polyethylene-made porous film of 30 μm was used as a separator; and a lithium ion secondary battery cell for evaluation was fabricated (Sample A2). Comparative samples were fabricated (Sample B2, Sample C2) by using Sample 2 and Sample 3 as the conductive material and under the same other conditions as in the case of using Sample 1. The obtained cell was set on a charge and discharge tester, and charge and discharge was carried out in the range of a voltage of 4.3 V to 2.5 V. The acquired discharge capacity was about 170 mAh/g for every of Samples A2, B2 and C2. Further, by measuring the charge capacity at 0.1 C, 2 C, 5 C and 10 C, the rate characteristics were evaluated. It was found from Table 2 that when Sample 1 was used as the conductive material of the positive electrode, the discharge rate characteristic was improved. This is considered to be because since fibrous carbon nanohorn aggregates and highly-dispersive globular carbon nanohorn aggregates were contained in Sample 1, good conductive paths were formed and the internal resistance of the battery was reduced. No large difference was observed between Sample 2 and Sample 3.

TABLE 2

| | | 2 C/0.1 C (%) | 5 C/0.1 C (%) | 10 C/0.1 C (%) |
|---|---|---|---|---|
| Sample A2 | discharge | 90 | 75 | 60 |
| Sample B2 | discharge | 90 | 66 | 50 |
| Sample C2 | discharge | 90 | 64 | 47 |

Example 6

[Fuel Cells]

The catalytic activities of Samples 1, 2 and 3 fabricated in Example 1 were evaluated by the oxygen reduction reaction using an electrochemical means. The measurement was carried out by using the regular three-electrode type cell utilizing a rotating electrode. The Samples were fixed by fabricating a dispersion solution of the powder of Sample 1, 2 or 3, a fluororesin copolymer solution (register trade name of "Nafion", manufactured by Du Pont) and water, and adding the dispersion solution on the rotating electrode as a working electrode. As a reference electrode, Ag/AgCl was used, and as a counter electrode, platinum was used. As an electrolyte solution, 0.1M KOH was used. Because of in an alkali solution, the potential window used was made to be 0 V to −0.8 V. The rotation rate of the electrode was made to be 1,500 rpm. The electrolyte solution was fully supersaturated with oxygen; and voltage scan was carried out at 0.05 mV/s and the current was measured. The results are shown in Table 3. In Sample 1, the current density largely varied at −0.4 V and it was thus found that the catalytic activity was high. It was also found that the fabrication in a nitrogen atmosphere gave a higher catalytic activity. Here, since the oxidative current was taken to be positive, the reductive current was negative.

TABLE 3

|  | Sample 1 | Sample 2 | Sample 3 |
| --- | --- | --- | --- |
| Current Density at −0.4 V (mA/cm$^2$) | −0.04 | −0.007 | −0.015 |

Example 7

[Fuel Cells]

In Example 7, the carbon nanohorn aggregate according to the present invention was used as a catalyst carrier for fuel cells. 1 g of chloroplatinic acid hydrate was dissolved in water at 70° C., and 2 g of sodium sulfite was added and stirred. The pH was controlled at about 5 by using sodium hydroxide, and thereafter, about 1.5 g of Sample 1 fabricated in Example 1 was added. 50 ml of a 30% hydrogen peroxide aqueous solution was added, and the pH was regulated so as to become 5. Thereafter, the resultant was cooled to room temperature, and Sample 1 carrying the Pt catalyst was separated by centrifugal separation, and dried at 100° C. Thereafter, the resultant was reduced with hydrogen. The carrying rate was confirmed to be 20% by thermogravimetrically analyzing Sample 1 carrying Pt in oxygen (Pt-carrying Sample 1). Further, for comparison, Pt was made to be carried on usual Sample 2 and Sample 3 by the same method (Pt-carrying Sample 2, Pt-carrying Sample 3), and the carrying rates were confirmed to be 20% by thermogravimetry. The catalytic activity of the Pt catalyst was evaluated by the methanol oxidizing reaction using an electrochemical means. The measurement was carried out using a regular three-electrode cell. A working electrode was fabricated by applying the catalyst on a carbon sheet; as a reference electrode, Ag/AgCl was used, and as a counter electrode, platinum was used. An electrolyte solution was prepared so as to become 1M $CH_3OH$ and 0.5M $H_2SO_4$. The specific activities (A/g-Pt) at 0.5 V vs. RHE at this time are shown in Table 4. In this case, comparing three catalysts, it was found that the specific activity in methanol oxidation of the Pt catalyst carried on Sample 1 according to the present invention was higher than that of the Pt catalyst carried on Sample 2 and Sample 3. Further, the catalytic activity was more improved in the case of containing nitrogen than in the case of containing no nitrogen.

TABLE 4

|  | Pt-Carrying Sample 1 | Pt-Carrying Sample 2 | Pt-Carrying Sample 3 |
| --- | --- | --- | --- |
| Specific Activity (A/g-Pt, 0.5 V vs. RHE) | 30 | 15 | 20 |

Example 8

[Actuators]

In Example 8, the carbon nanohorn aggregate according to the present invention was used as an electrode material of electrochemical actuators. Sample 1 (50 mg) fabricated in Example 1, a polyvinylidene fluoride (hexafluoropropylene) (PVDF-HFP) (80 mg) and 1-ethyl-3-methylimidazolium tetraborate (EMI-$BF_4$, ionic liquid) (120 mg) were mixed in dimethylacetamide (DMAC), and ultrasonically dispersed to thereby prepare an electrode liquid. The obtained electrode liquid was put in a mold of 3 cm×3 cm; the solvent was dried to thereby obtain an electrode layer. EMI-$BF_4$ (100 mg) and PVDF-HFP (100 mg) were dissolved in methyl pentanone and propionic carbonate, and heated and stirred to thereby prepare an electrolyte solution. The obtained electrolyte solution was put in a mold of 3 cm×3 cm; and the solvent was dried to thereby obtain an electrolyte layer. The electrolyte layer was interposed between the electrode layers, and hot pressed to thereby fabricate an actuator device having a three-layer structure (Sample A3). Actuator devices having a three-layer structure were fabricated using Sample 2 and Sample 3 fabricated in Example 1 under the same conditions (Sample B3, Sample C3). When a voltage was applied, the device deformed due to ion migration in the electrolyte layer. Comparing Sample A3, Sample B3 and Sample C3, the deformation amount of Sample A3 was largest, and those of Sample B3 and Sample C3 were nearly identical. Therefore, it was found that the characteristic was better in the mixed presence of the fibrous carbon nanohorn aggregates and the globular carbon nanohorn aggregates. The deformation amount of electrodes (Sample D3) fabricated by mixing the single-walled CNT and Sample 2 was larger than that of Sample B3, using Sample 2 alone, but was smaller than that of Sample A3.

Example 9

In Example 9, the carbon nanohorn aggregate according to the present invention was used as an electrode material of electrochemical actuators. Openings were made by oxidatively treating Sample 1 fabricated Example 1 in air. The opening treatment involved heating at a temperature-rise rate of 1° C./min up to 450° C. in air to thereby fabricate Sample 4. The obtained Sample, since internal spaces of carbon nanohorns could be utilized, had a specific surface area about three times those of Samples 1, 2 and 3. An actuator device having a three-layer structure was fabricated (Sample D3) by using Sample 4 and under the same conditions as in Example 8. The deformation amount by a voltage became larger in Sample D3 than in Sample A3. This is because the opening treatment made the specific surface area large.

Example 10

[Electric Double-Layer Capacitors]

In Example 10, the carbon nanohorn aggregate according to the present invention was used as an electrode material of electric double-layer capacitors. 90% by mass of Sample 1 fabricated in Example 1 and 10% by mass of PVDF were mixed; and N-methyl-2-pyrrolidinone was further mixed and fully stirred to thereby fabricate a paste. The obtained paste was applied in a thickness of about 50 µm on current collectors (positive electrode, negative electrode). Thereafter, the electrodes were dried at 120° C. for 10 minutes, and press molded by roll press. Further, the electrodes were vacuum dried at 60° C. for 24 hours, and punched out into a circle of 12 mm in diameter. A coin cell was fabricated (Sample A4) by using an ionic liquid (EMI-BF$_4$) as an electrolyte solution and a glass filter as a separator.

Further, coin cells were fabricated (Sample B4, Sample C4, Sample D4) by using Sample 2 and Sample 3 fabricated in Example 1 and Sample 4 fabricated in Example 9 and under the same conditions as in Sample 1.

The cells (Samples A4 to D4) were set on a charge and discharge tester; and charge and discharge were carried out at a constant current from a voltage of 0 V to a voltage of 3.0 V. The rate characteristic (quick charge and discharge property) was evaluated as the discharge characteristics at 1, 20 and 40 A/g in the same voltage range as in the above. It was found that the capacity at the low rate was largest in Sample D4 and depended on the specific surface area. At the high rate, the capacity reduction of Sample A4 and Sample D4 along with the increase of the discharge speed was low. Therefore, it was found that when the fibrous carbon nanohorn aggregates were contained, the resistance in the electrode interior was reduced.

TABLE 5

|  | 1 A/g | 20 A/g | 40 A/g |
| --- | --- | --- | --- |
| Sample A4 (discharge capacity (mAh/g)) | 40 | 35 | 30 |
| Sample B4 (discharge capacity (mAh/g)) | 40 | 30 | 20 |
| Sample C4 (discharge capacity (mAh/g)) | 40 | 30 | 20 |
| Sample D4 (discharge capacity (mAh/g)) | 50 | 45 | 40 |

(Supplementary Note 1):
A nano-carbon composite comprising a carbon nanohorn aggregate according to claims 1 to 6, and one or more of carbon nanotube, carbon fiber, graphene, carbon black, fullerene, graphite and amorphous carbon mixed therewith.
(Supplementary Note 2):
An electrode material comprising a carbon nanohorn aggregate according to claims 1 to 6, or a nano-carbon composite according to Supplementary Note 1.
(Supplementary Note 3):
An electrode material comprising a carbon nanohorn aggregate according to claims 1 to 6 or a nano-carbon composite according to Supplementary Note 1, and an active substance for a lithium ion battery.
(Supplementary Note 4):
A catalyst comprising a carbon nanohorn aggregate according to claims 1 to 6.
(Supplementary Note 5):
A catalyst carrier comprising a carbon nanohorn aggregate according to claims 1 to 6.

Hitherto, the present invention has been described by reference to the example embodiment (and the Examples), but the present invention is not limited to the above example embodiment (and the Examples). Various modifications and changes understandable to those skilled in the art may be made on the structure and details of the present invention within the scope of the present invention.

This application claims priority based on Japanese Patent Application No. 2015-052185, filed on Mar. 16, 2015, and Japanese Patent Application No. 2015-124577, filed on Jun. 22, 2015, the entire disclosure of which is hereby incorporated by reference.

The invention claimed is:

1. A fibrous carbon nanohorn aggregate, in which a plurality of single-walled carbon nanohorns are aggregated in a fibrous state.

2. The fibrous carbon nanohorn aggregate according to claim 1, wherein the fibrous carbon nanohorn aggregate has a diameter of 30 nm to 200 nm, and a length of 1 µm to 100 µm.

3. The fibrous carbon nanohorn aggregate according to claim 1, wherein each of the single-walled carbon nanohorns has a diameter of 1 nm to 5 nm and a length of 30 nm to 100 nm.

4. The fibrous carbon nanohorn aggregate according to claim 1, wherein the fibrous carbon nanohorn aggregate comprises at least one of seed-shaped, dahlia-shaped, bud-shaped, petal-dahlia-shaped and petal-shaped carbon nanohorn aggregates.

5. A mixture of carbon nanohorn aggregates, comprising the fibrous carbon nanohorn aggregate according to claim 1 and at least one of seed-shaped, bud-shaped, dahlia-shaped, petal-dahlia-shaped and petal-shaped globular carbon nanohorn aggregates.

6. The fibrous carbon nanohorn aggregate according to claim 1, comprising a catalyst metal incorporated in an interior of the fibrous carbon nanohorn aggregate.

7. A lithium ion secondary battery, comprising a positive electrode, a negative electrode, and an electrolyte, wherein one of the positive electrode or the negative comprises the fibrous carbon nanohorn aggregate according to claim 1.

8. A fuel cell, comprising the fibrous carbon nanohorn aggregate according to claim 1 as a catalyst or a catalyst carrier, the fuel cell configured to contact the catalyst or the catalyst carrier with hydrogen or an organic liquid fuel to create hydrogen ions.

9. An electrochemical actuator, comprising a stacked body in which electrode layers of a positive electrode and a negative electrode are portioned by an electrolyte layer therebetween, wherein one of the positive electrode or the negative electrode comprises the fibrous carbon nanohorn aggregate according to claim 1.

10. An electric double-layer capacitor, comprising an electrode, wherein the electrode comprises the fibrous carbon nanohorn aggregate according to claim 1.

11. A nano-carbon composite comprising the fibrous carbon nanohorn aggregate according to claim 1, and one or more of carbon nanotube, carbon fiber, graphene, carbon black, fullerene, graphite and amorphous carbon mixed therewith.

12. An electrode material comprising the fibrous carbon nanohorn aggregate according to claim 1 and one of a positive active material or a negative active material.

13. An electrode material comprising the nano-carbon composite according to claim 11.

14. An electrode material comprising the fibrous carbon nanohorn aggregate according to claim 1, and an active substance for a lithium ion battery.

15. An electrode material comprising the nano-carbon composite according to claim 11, and an active substance for a lithium ion battery.

* * * * *